Feb. 22, 1966 P. B. WITTIG 3,236,656
METHOD FOR TREATING THE SURFACE OF MEAT PIECES
Filed March 5, 1963

INVENTOR.
POUL BENDSON WITTIG
BY
Amster & Levy
ATTORNEYS

United States Patent Office 3,236,656
Patented Feb. 22, 1966

3,236,656
METHOD FOR TREATING THE SURFACE OF MEAT PIECES
Poul Bendson Wittig, Roskilde, Denmark, assignor to Cimbrer Staal A/S, Aalborg, Denmark
Filed Mar. 5, 1963, Ser. No. 262,930
2 Claims. (Cl. 99—107)

The present invention relates to a method of treating the surface of meat pieces with a view to make them suitable for being united into larger pieces by adhesion.

It is well known to unite two or more smaller pieces of meat by adhesion so as to form a larger piece of meat or to unite the parts of a piece of meat that has been cut open for removal of bones so that the surfaces of the cut adhere to each other when the meat is folded. Where the meat is intended for slicing, it is particularly important to insure that the slices do not fall apart. This is especially required in the treatment of processed ham wherein the center bone is removed and the meat repressed together and shaped into a uniform entity. To give the surface of the meat pieces the necessary adhesive qualities the meat cells have to be opened so that the protein meat juice gets to the surface, and by its subsequent coagulation, produced by heating, provides the adhesive effect.

It is known to treat the surface of meat pieces with a steel spiked brush. When the spikes of the brush are passed across the meat surface the meat cells are torn open so that the meat juice gets to the surface and renders the adhesion possible. However, this method has the drawback that either it is only the highest points of the meat surface that are treated, or it involves excessive tearing of the meat at its highest points if the spikes are to get down to the lowermost points of the meat surface to give this a suitable treatment. These drawbacks may be avoided by rubbing minced meat over the meat surfaces to be joined but this operation is not a very rational one.

It is an object of the present invention to provide a method for treating meats which eliminates the drawbacks of the known methods, its essential feature being that it is automatic and that the surface of the meat pieces is whipped by means of cords of a flexible material such as rubber or plastic. The result obtained is a uniform treatment of the whole surface, whips imparted by means of the cords being sufficient to cause the cells to burst, but at the same time the cords are deflected by the resistance encountered, wherefore the high and the low points of the meat surface are treated to the same depth.

The invention is furthermore concerned with an apparatus for carrying the method described into effect. The essential feature of the said apparatus is that it consists of a rotatably mounted shaft to which are attached cords of flexible material. The meat pieces to be treated may then be kept at barely within a cord length of the shaft while the shaft is rotating, whereby the meat surface will be struck by the whips of the cords. The apparatus need not necessarily be stationary; it may, if desired, be designed as a tool passed against resting pieces of meat.

It has been found that the most uniform treatment of the meat surfaces is obtained when the meat moves concurrently with the cords. A special embodiment of the apparatus according to the invention that is suitable for giving this treatment has the essential feature that the shaft is mounted horizontally above a conveyor at a distance from same of well over the length of the cords.

Additional objects and advantages of the invention will become apparent during the course of the following specification when taken in connection with the accompanying drawings, in which.

Figure 1:
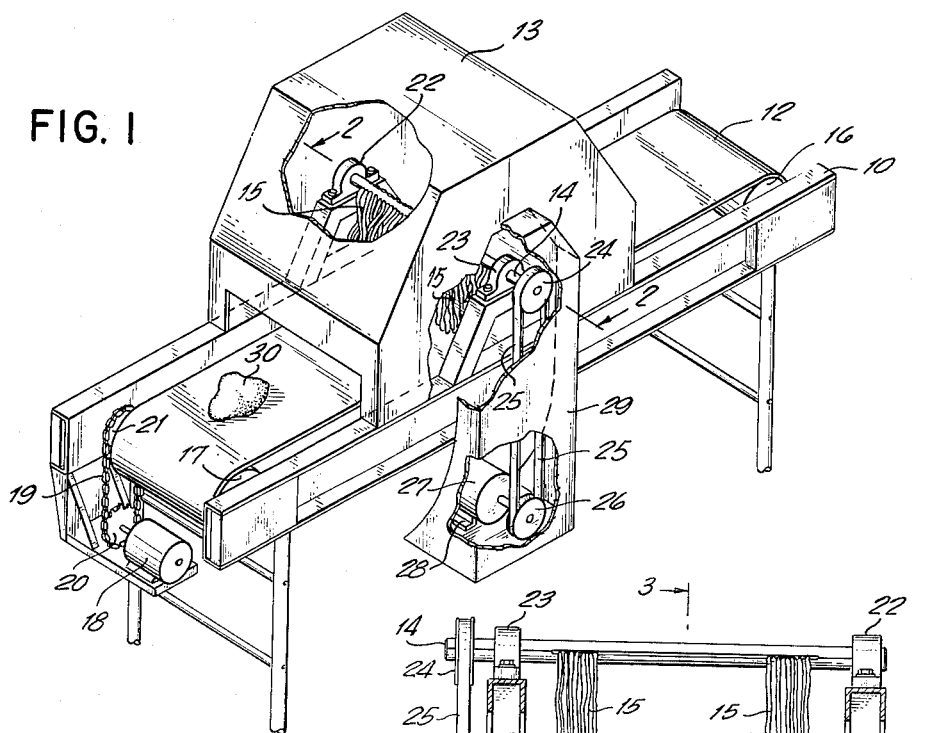
FIG. 1 is a perspective view of a preferred form of machine embodying the invention herein, with portions of the machine broken away to disclose inner constructional details.

Referring in detail to the drawings, the machine shown in FIG. 1 comprises a frame 10 with a central works or table surface formed by an endless conveyor belt 12. Mounted centrally upon the frame 10 is a hood or housing 13, within which a shaft 14 is rotatably mounted. The shaft 14 is located at a suitable level above the conveyor belt 12 and carries a number of flexible cords 15, as will be presently described in greater detail.

The conveyor belt 12 extends substantially the length of the frame 10 and is mounted on an idler roller 16 journalled at one end of the frame 10 and a drive roller 17 journalled at the other end of the frame. An electric motor 18 is employed to turn the drive roller 17 through suitable coupling means such as intermeshed gearing or the chain and sprocket arrangement 19, 20, 21 illustrated in FIG. 1. The motor 18 and its coupling means are so arranged as to drive the conveyor belt 12 at a relatively slow speed, in one commercial embodiment, said belt being driven at a linear speed of approximately seventeen feet per minute.

The shaft 14 is journalled at its ends in respective brackets 22, 23 mounted on opposite sides of the central portion of frame 10. A pulley 24 is affixed to one end of shaft 14 and is coupled by a flexible belt 25 to a pulley 26 affixed to the shaft of an electric motor 27 mounted beneath the frame 10 as by a bracket 28. The electric motor 27 is adapted to rotate the shaft 14 at a relatively high speed, as a preferred example, at a speed of 800 revolutions per minute. An auxiliary hood or cover 29 may be employed for mounting the bracket 28 and also for covering over the motor 27, belt 25, pulleys 24, 26, and the end of shaft 14.

Figure 2:
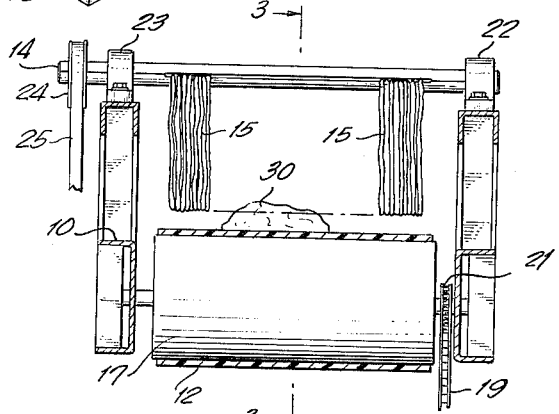
FIG. 2 is a sectional view of the upper portion of the machine, taken substantially along line 2—2 of FIG. 1 and showing the shaft in its stationary condition with the center cords omitted for clarity of illustration.
Figure 3:
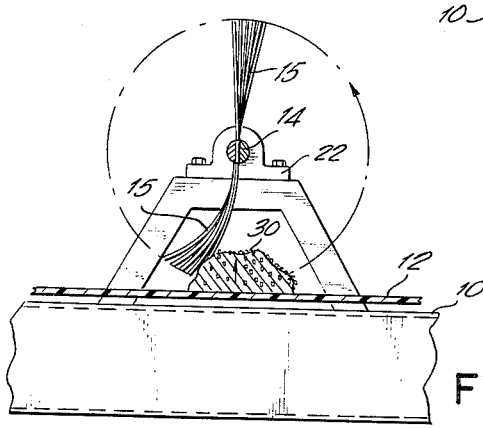
FIG. 3 is a section of the central portion of the machine taken along line 3—3 of FIG. 2, but showing the shaft while rotating.

The cords 15 are made of flexible material, rubber or flexible material being particularly suitable for this purpose since they are non-absorbent. The cords 15, as shown in FIGS. 2 and 3 are arranged in two groups of closely spaced rows mounted on diametrically-opposed sides of the shaft 14. As an alternative, the cords 15 may be made of double length and mounted at their centers in a split shaft 14.

When the shaft 14 is stationary, the cords 15 hang suspended as shown in FIG. 2. When the shaft 14 is rotated at high speed, the cords 15 straighten out and extend radially from the opposite sides of shaft 14, as shown in FIG. 3, so as to strike a piece of meat 30 carried by the conveyor belt 12. For this purpose, the lengths of the cords 15 between their free ends and the shaft 14 are slightly less than the vertical distance between the shaft 14 and the conveyor belt 12, although all of the cords need not be of exactly identical length. Thus, the cords 15 will rapidly and successively strike all of the surface area of the piece of meat 30 regardless of the contour of the piece, producing a whipping effect thereon. That is to say, both the high and low surface areas of the piece of meat will be equally whipped and treated.

Figure 4:
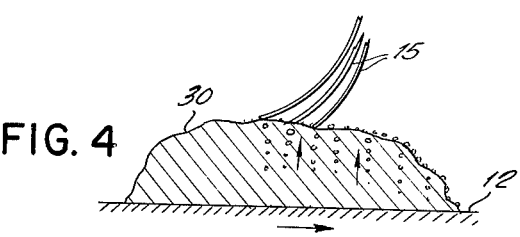
FIG. 4 is a partial section on an enlarged scale showing the manner in which the cords of the rotating shaft contact the meat to be treated.

In operation, pieces of meat are placed at one end of the conveyor belt and are slowly carried beneath the hood 13 and into the vicinity of the rapidly rotating cords 15. As the piece of meat moves beneath the shaft 14, the cords 15 strike the entire surface area of the meat rapidly and successively, and with considerable force. As shown in FIGS. 3 and 4, the cords 15 are deflected when striking the meat so that they do not penetrate the surface to any depth, but merely cause the cells of a thin surface layer to rupture. This whipping action raises the protein meat juices to the surface so that when the piece of meat leaves the hood 13 and is taken off the opposite end of the conveyor belt 12, it is prepared to be joined by adhesion to a similarly-treated piece of meat.

The speed of the conveyor belt 12 and the rotational speed of shaft 14 are so regulated that each piece of meat 30 carried by the conveyor belt is subjected to the whipping action of the flexible cords 15 for a sufficient time to rupture the cells on the exposed surface of the meat and raise protein meat juices to the surface. While the minimum whipping period will vary with different sizes and types of meats as well as the speed and striking force of the cords, it is a simple matter for those skilled in the art to determine when the whipping period has progressed sufficiently to treat the meat thoroughly. The protein meat juices can be visually observed when they rise to the meat surface, or the operator may touch the meat surface with his fingers to determine whether or not the surface is ready for joining. In practice, it has been found that the shaft speed and conveyor speed specified above are normally sufficient to process most meat cuts.

The method and apparatus disclosed herein is particularly useful in the preparation of processed hams and other meats in which the bone is removed and the meat is reformed as a single boneless piece. Hereinbefore, it has been necessary to remove the bone in a highly skilled manual operation in which the meat is carefully cut around and closely adjacent to the bone without splitting apart the meat piece. Such operation is extremely time-consuming and costly. In utilizing the present invention, however, the piece of meat can be cut apart into two or more sections in the vicinity of the bone, so that the bone is exposed and can readily be removed. The cut surfaces of the meat sections are then whipped in the manner previously described and are pressed together to provide a uniform unit of boneless meat.

While a preferred embodiment of this invention has been shown and described herein, it is obvious that numerous additions, changes and omissions may be made therein without departing from the spirit and scope of the invention.

What I claim is:

1. A method treating the inner surfaces of boneless pieces of meat which have been cut adjacent the bone to expose said inner surfaces wherein a void is left by removing the bone, comprising the steps of moving the meat pieces with the cut inner surfaces thus exposed at a slow rate through a whipping zone, striking the exposed cut meat surfaces with a plurality of closely-spaced elongated cords of flexible material at a considerably rapid rate in said whipping zone with sufficient force and for a sufficient time to rupure the cells on said exposed cut inner surfaces, and raise protein meat juices to said inner surfaces, said cords being sufficiently pliable to be deflected by a resistance encountered by the exposed cut inner surfaces of the meat whereby both high and low areas on the exposed cut inner meat surfaces are treated to the same depth, and then pressing the meat pieces together with the treated inner surfaces in flush contact until said treated surfaces adhere to each other, whereby the void left by the removal of the bone is replaced by meat.

2. The method of treating the surface of boneless pieces of meat as defined in claim 1, wherein the meat is ham.

References Cited by the Examiner

UNITED STATES PATENTS

| | | | |
|---|---|---|---|
| 772,964 | 10/1904 | Sackett | 17—25 |
| 2,205,133 | 6/1940 | Bragg | 17—25 |
| 2,274,250 | 2/1942 | Simkins | 99—107 |
| 2,398,636 | 4/1946 | Henney et al. | 99—107 |
| 2,826,772 | 3/1958 | Smith | 15—3.17 |
| 2,908,033 | 10/1959 | Zebarth | 17—11.1 X |
| 3,076,713 | 2/1963 | Maas | 99—107 |
| 3,119,145 | 1/1964 | Weprin | 17—45 |
| 3,145,415 | 8/1964 | Zebarth et al | 17—11.1 |

A. LOUIS MONACELL, *Primary Examiner.*

HYMAN LORD, *Examiner.*